United States Patent [19]

Oka

[11] Patent Number: 5,835,081

[45] Date of Patent: Nov. 10, 1998

[54] HANDWRITING DATA-ENTRY APPARATUS AND CONTROL METHOD THEREOF

[75] Inventor: Kouji Oka, Isehara, Japan

[73] Assignee: Ricoh Company, Ltd., Tokyo, Japan

[21] Appl. No.: 551,129

[22] Filed: Oct. 31, 1995

[30] Foreign Application Priority Data

Dec. 19, 1994 [JP] Japan .................................. 6-333843

[51] Int. Cl.[6] .................................................... G09G 5/00
[52] U.S. Cl. .......................................... 345/173; 382/186
[58] Field of Search ..................... 345/79–182, 173–178; 382/119, 186, 187, 229; 178/18, 19

[56] References Cited

U.S. PATENT DOCUMENTS

| | | | |
|---|---|---|---|
| 5,559,897 | 9/1996 | Brown et al. .......................... | 382/119 |
| 5,577,135 | 11/1996 | Grajski et al. ......................... | 382/187 |
| 5,623,555 | 4/1997 | Nelson et al. ......................... | 382/119 |

*Primary Examiner*—Regina Liang
*Attorney, Agent, or Firm*—Oblon, Spivak, McClelland, Maier & Neustadt, P.C.

[57] ABSTRACT

A handwriting data-entry apparatus includes an input panel on which a line is drawn by a handwriting operation of a user, a sampling unit for sampling points on the line drawn on the input panel at predetermined intervals and outputting coordinates of sampled points, and a correcting unit for correcting coordinates of a focus point output by the sampling unit using coordinates of points sampled before and after the focus point is sampled.

10 Claims, 5 Drawing Sheets

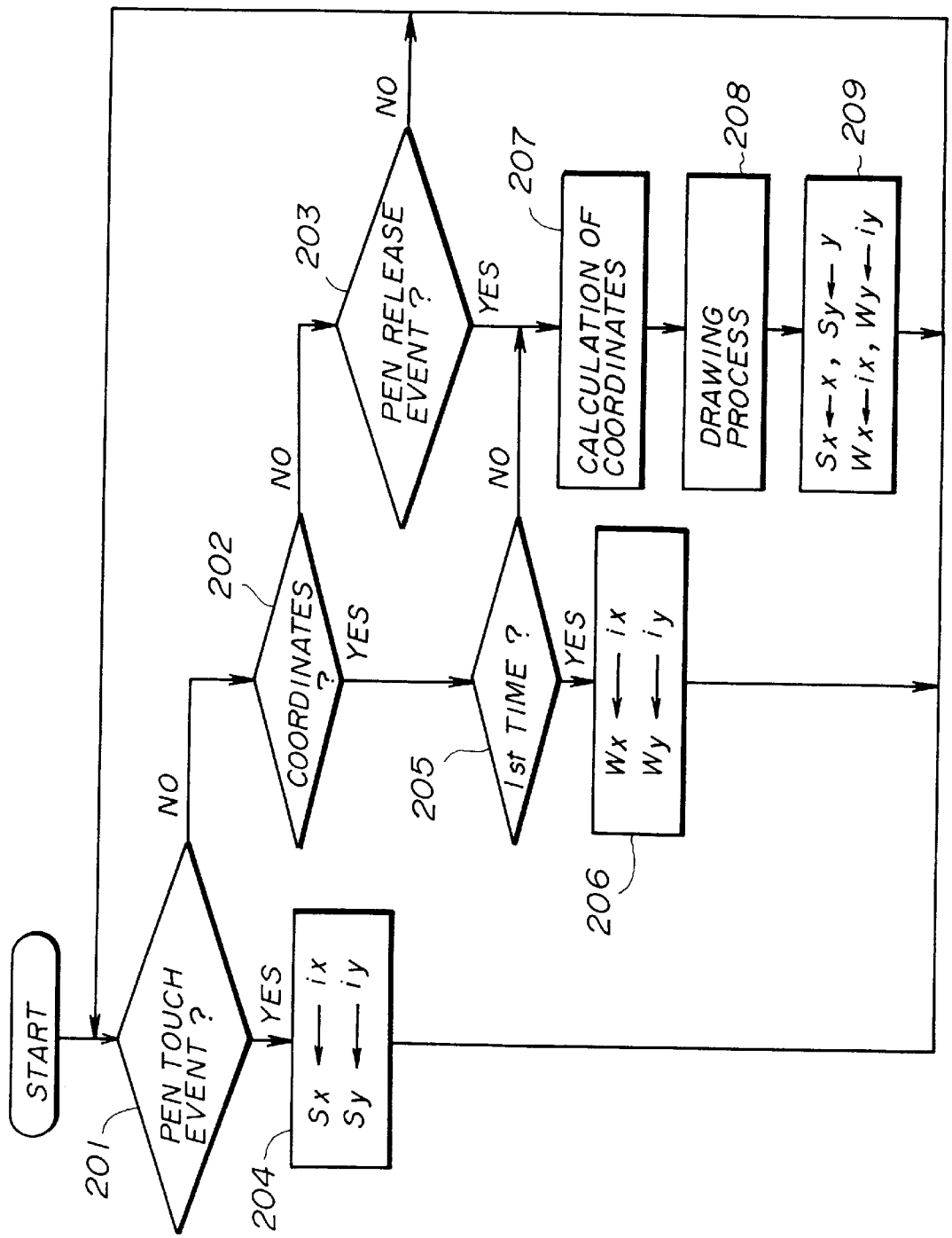

HANDWRITING DATA-ENTRY APPARATUS AND CONTROL METHOD THEREOF

BACKGROUND OF THE INVENTION (1) Field of the Invention

The present invention generally relates to a handwriting data-entry apparatus and a control method thereof, and more particularly to a handwriting data-entry apparatus in which points on a line handwritten on an entry operation panel are sampled at predetermined intervals and coordinates of the sampled points are obtained, and a method for controlling the handwriting data-entry apparatus.

(2) Description of the Related Art

In an information processing apparatus, such as a telewriting terminal, for exchanging handwritten information with another terminal, a touch panel is used as entry means. Points on a line handwritten using a touch pen on the touch panel are sampled at predetermined intervals, and it is determined, based on coordinates of the sampled points, what line is handwritten by a user on the touch panel.

The conventional handwriting data-entry apparatus described above has the following disadvantages.

The relationship between the sampling timing and the handwriting operation, the distance between points on the touch panel touched by the touch pen and a detecting grid of a sensor of the touch panel, and the detecting accuracy of the sensor of the touch panel may cause an error between the line actually formed by the handwriting operation and the line recognized based on the coordinates of the sampled points.

For example, the error is shown in FIG. 1. In FIG. 1, a dashed line indicates a movement locus of the touch pen on the touch panel by the handwriting operation. Black dots are sampled points and a solid line chaining the black dots together indicates the line recognized by the apparatus.

In order to eliminate the above disadvantage, an apparatus disclosed in Japanese Laid Open Patent Application No.61-502224 has been proposed. However, in this conventional apparatus, in a case where a large number of points on a movement locus of the touch pen are successively sampled, a vast amount of calculation is needed to obtain coordinates of all the sampled points. Thus, the conventional apparatus is not suitable for real time recognition of a handwritten line.

SUMMARY OF THE INVENTION

Accordingly, a general object of the present invention is to provide a novel and useful handwriting data-entry apparatus and a control method thereof in which the disadvantages of the aforementioned prior art are eliminated.

A more specific object of the present invention is to provide a handwriting data-entry apparatus in which coordinates of sampled points can be rapidly and accurately corrected.

The above objects of the present invention are achieved by a handwriting data-entry apparatus comprising: an input panel on which a line is drawn by a handwriting operation of a user; sampling means for sampling points on the line drawn on the input panel at predetermined intervals and outputting coordinates of sampled points; and correcting means for correcting coordinates of a focus point output by the sampling means using coordinates of points sampled before and after the focus point is sampled.

According to the present invention, the coordinates of the focus point are corrected using the coordinates of points sampled before and after the focus point is sampled, and the corrected coordinates of the focus point are used as coordinates of the sampled point. Thus, the coordinates of the sampled points can be rapidly and accurately corrected.

Another object of the present invention is to provide a control method of the handwriting data-entry apparatus.

The object of the present invention is achieved by a method for controlling a handwriting data-entry apparatus comprising an input panel on which a line is drawn by a handwriting operation of a user and sampling means for sampling points on the line drawn on the input panel at predetermined intervals and outputting coordinates of sampled points, the method comprising steps of: (a) correcting coordinates of a focus point output by the sampling means using coordinates of points sampled before and after the focus point is sampled; and (b) outputting corrected coordinates obtained by the step (a) as coordinates of a sampled point on the line drawn on the input panel.

According to the present invention, the control method of the above handwriting data-entry apparatus can be obtained.

BRIEF DESCRIPTION OF THE DRAWINGS

Other objects, features and advantages of the present invention will become apparent from the following detailed description when read in conjunction with the accompanying drawings, in which:

FIG. 6 is a flowchart illustrating an input coordinate calculation process for correcting input coordinates obtained by the scanning process shown in FIG. 5.

DESCRIPTION OF THE PREFERRED EMBODIMENTS

A description will now be given of an embodiment of the present invention.

Figure 1:
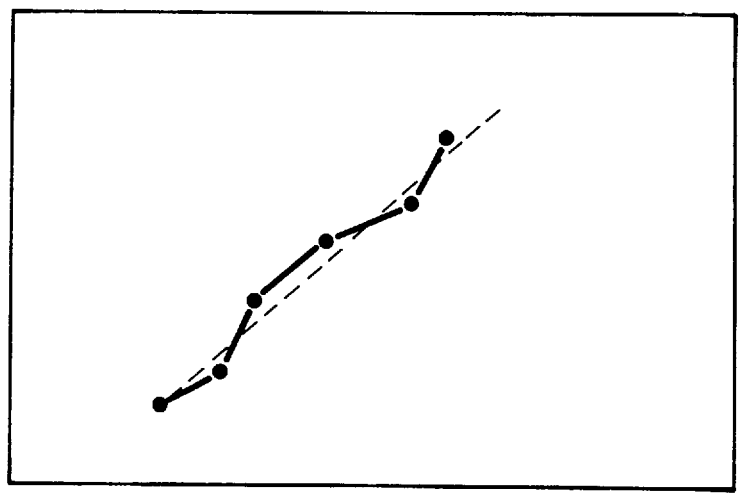
FIG. 1 is a diagram illustrating an example of an error between a movement locus of a touch pen by a handwriting operation and a line recognized based on coordinates of sampled points.
Figure 2:
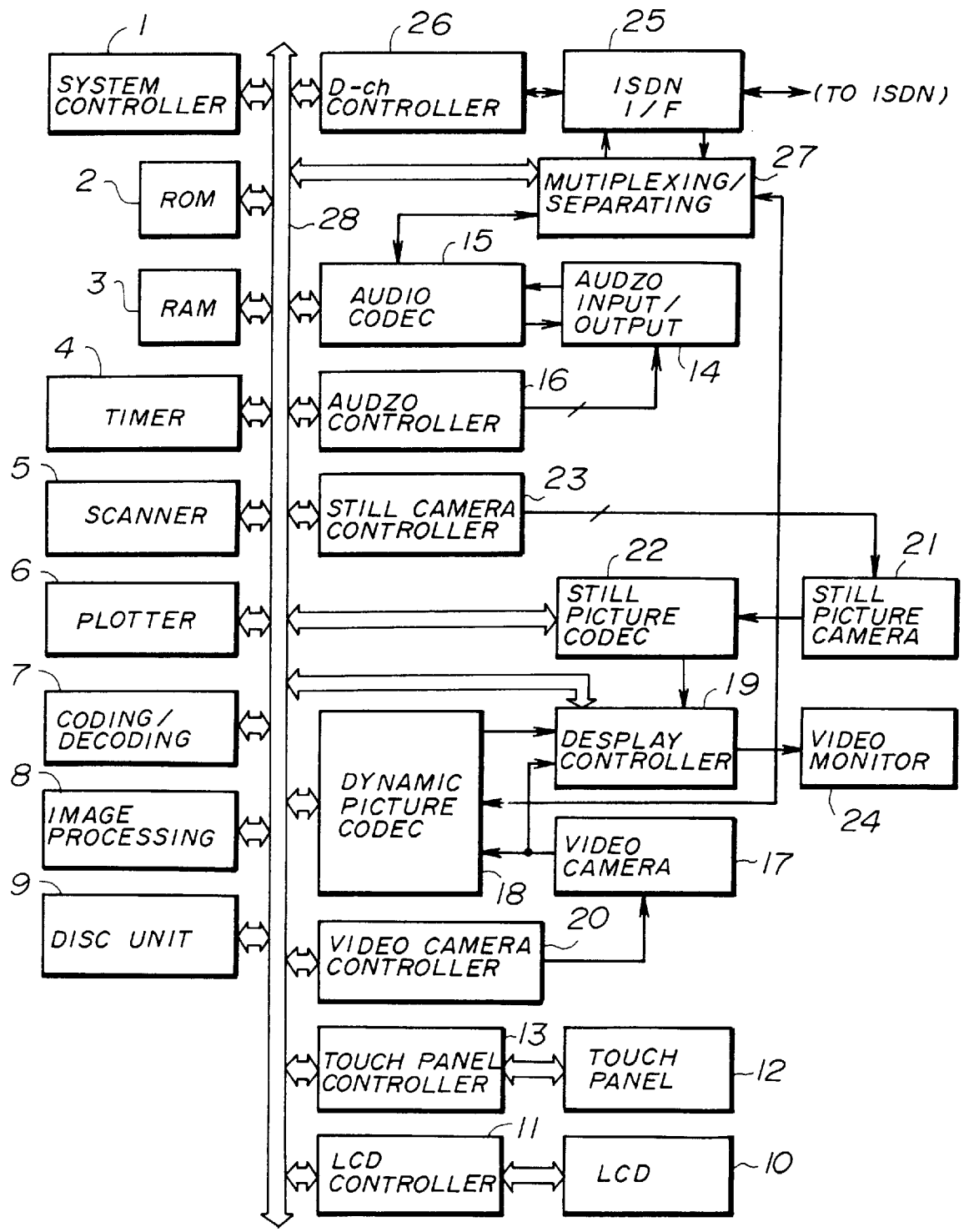
FIG. 2 is a block diagram illustrating a teleconference terminal according to an embodiment of the present invention.

A teleconference terminal according to an embodiment of the present invention is shown in FIG. 2. This teleconference terminal uses a basic interface of the ISDN as a transmission path and is provided with an audio communication function, a dynamic picture communication function, a still picture communication function, a facsimile communication function, a telewriting function and a multiplexing function of these communication functions. The teleconference terminal is connected to the basic interface of the ISDN and can perform data communication using two information channels (B-channels).

Referring to FIG. 2, a system controller 1 executes various control processes, such as a process for controlling respective parts of the teleconference terminal, a process for an upper layer of a video conference communication, a process for application programs provided in the teleconference terminal and a help display process in response to a help request from a user. A ROM (Read Only Memory) 2 stores some of control programs to be executed by the controller 1 and data needed to execute the control programs. A RAM (Random Access Memory) 3 is used as a work area for the controller 1.

A timer circuit 4 outputs present date information. A scanner 5 optically reads an original image at a predetermined resolution. A plotter 6 prints out an image at a predetermined resolution. A coding/decoding unit 7 codes image signals obtained by the scanner 5 in accordance with a coding system of a group 4 facsimile function. The coding/decoding unit 7 decodes coded image information to original image information. An image processing unit 8 executes various image processes, such as a zooming process and a process for changing the resolution. A magnetic disk unit 9 stores system software, a plurality of application programs and a large number of user's files.

A liquid crystal display unit 10 is used as a display unit for the telewriting communication function and is used to display information in operations of this teleconference terminal. An LCD display controller 11 controls the liquid crystal display unit 10.

A touch panel 12 is mounted on a display surface of the liquid crystal display unit 10. The touch panel 12 outputs coordinate data representing coordinates of a point at which the touch panel 12 is touched by a touch pen and touch state data indicating that the touch pen is on the touch panel 12. A touch panel controller 13 controls the touch panel 12.

An audio input/output unit 14 is used for calls, and has a microphone and a loudspeaker through which voices are respectively input and output. Analog audio signals output from the microphone of the audio input/output unit 14 are supplied to an audio CODEC 15, and analog audio signals to be supplied to the loudspeaker of the audio input/output unit 14 are output from the audio CODEC 15.

The audio CODEC 15 converts the analog audio signals into digital data in order to transmit audio information using the B-channel of the ISDN. An audio controller 16 controls the audio input/output unit 14.

A video camera unit 17 takes pictures of a user of the teleconference terminal. Dynamic picture information output from the video camera unit 17 is supplied to video input terminals of a dynamic picture CODEC 18 and a display controller 19. A video camera controller 20 controls various operations of the video camera unit 17, such as an on-and-off operation, a zoom-in/zoom-out operation and a panning operation.

The dynamic picture CODEC 18 codes video signals from the video camera unit 17 in accordance with a coding system provided in a "TTC standard JT-H. 261" so as to form dynamic picture information, and decodes coded dynamic picture information to obtain original video signals.

A still picture camera 21 is used to take a still picture. Still picture signals output from the still picture camera 21 are supplied to a still picture CODEC 22. A still camera controller 23 controls the still picture camera 21.

The sill picture CODEC 22 codes the still picture signals supplied from the still picture camera 21 in accordance with a predetermined coding system (e.g., a JPEG system), and decodes coded still picture information to obtain original still picture signals. Still picture signals for one frame or still picture signals obtained by the decoding operation are supplied to a still picture signal input terminal of the display controller 19.

The display controller 19 controls information which should be displayed on a video monitor unit 24. All or some of display screen information items corresponding to dynamic signals output from the video camera unit 17, dynamic picture signals output from the dynamic picture CODEC 18 and still picture signals output from the still picture CODEC 22 are formed in accordance with instructions from the system controller 1. The display screen information items are then integrated into the display screen of the video monitor unit 24.

An ISDN interface circuit 25 is connected to the ISDN and has a function for processing signals in a layer 1 of the ISDN and an integration/separation function for integrating/separating signals in the D-channel and signals in the two B-channels. The signals in the D-channel are exchanged with a D-channel transmission controller 26. The signals in the two B-channels are exchanged with a multiplexing/separating unit 27.

The D-channel transmission controller 26 has a function for processing signals in a layer 2 of the D-channel and a call control function for the B-channels.

The multiplexing/separating unit 27 multiplexes data of a plurality of media, such as voices, dynamic pictures and other data (e.g., still picture data) and forms frame data defined in the "TTC standard JT-H. 221". The frame data is supplied to the network. The multiplexing/separating unit 27 separates received frame data into which data of the plurality of media are multiplexed. The multiplexing/separating unit 27 exchanges audio data with the audio CODEC 15, dynamic picture data with the dynamic picture CODEC 18 and other data with the system controller 1.

The system controller 1, the ROM 2, the RAM 3, the timer circuit 4, the scanner 5, the plotter 6, the coding/decoding unit 7, the image processing unit 8, the magnetic disk unit 9, the LCD display controller 11, the touch panel controller 13, the audio CODEC 15, the audio controller 16, the dynamic picture CODEC 18, the display controller 19, the video camera controller 20, the still picture CODEC 22, the still picture controller 23, the D-channel transmission controller 26 and the multiplexing/separating unit 27 are connected to an internal bus 28.

Figure 3:
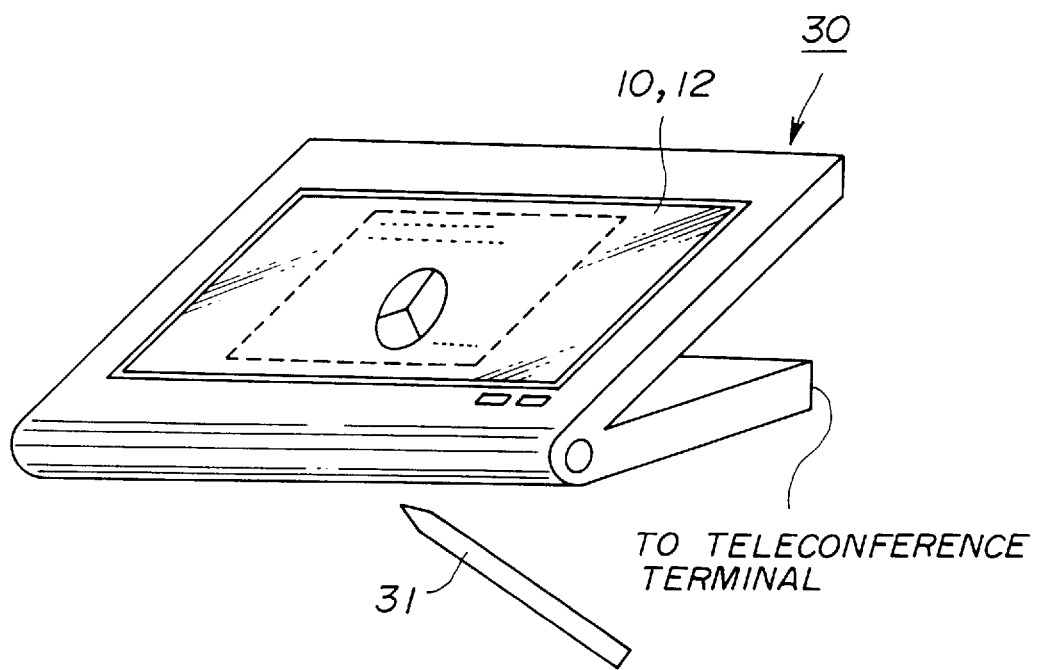
FIG. 3 is a perspective view illustrating an input operation device of the teleconference terminal shown in FIG. 2.

A data-entry operation display device of the teleconference terminal shown in FIG. 2 is formed as shown in FIG. 3.

Referring to FIG. 3, a data-entry operation display device 30 is provided with the liquid crystal display unit 10 and the touch panel 12 mounted on the display screen of the data-entry operation display device 30. A touch pen 31 is used for entry of information by a touch operation on the touch panel 12.

The touch panel 12 has an input sensor portion which detects X and Y coordinates of a point touched by the touch pen 31 on the input sensor portion. The input sensor portion has a function for detecting an event (a pen touch event) that the touch pen 31 touches the input sensor portion, and a function for detecting an event (a pen release event) that the touch pen 31 which has touched the input sensor portion is released therefrom.

Figure 4:
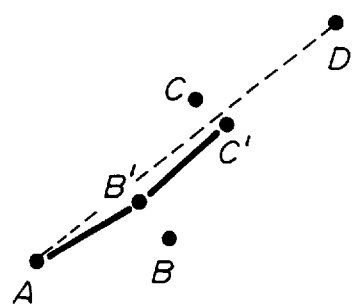
FIG. 4 is a diagram illustrating how coordinates of sampled points are corrected.

A drawing operation of the touch pen 31 on the touch panel 12 is carried out so that a movement locus of the touch pen 31 is formed as shown by a dashed line in FIG. 4. In this case, when the touch panel 12 detects a pen touch event at a point A, X and Y coordinates of the point A are supplied from the touch panel 12 to the touch panel controller 13. In the touch panel controller 13, the X and Y coordinates of the point A are respectively substituted for variables sx and sy.

Points on the movement locus are then sampled at predetermined intervals. When the touch panel 12 detects a point B (sampled) on the movement locus of the touch pen 31 at a first sampling time, X and Y coordinates of the point B are supplied to the touch panel controller 13. In the touch panel controller 13, the X and Y coordinates of the point B are respectively substituted for variables wx and wy.

When the touch panel 12 detects a point C on the movement locus of the touch pen 31 at the next sampling time, X and Y coordinates of the point C are supplied to the touch panel controller 13. In the touch panel controller 13, the X and Y coordinates of the point C are respectively substituted for variables ix and iy.

After this, the X and Y coordinates of the point B (a focus point which is a point to be corrected) are corrected using the X and Y coordinates of the points A and C. That is, the X and Y coordinates of the point B are corrected in accordance with the following equations (I) and (II) so that corrected x and y coordinates of a point B' are obtained.

$$x = (N*wx + sx + ix)/(N+2) \quad (I)$$

$$y = (N*wy + sy + iy)/(N+2) \quad (II)$$

In the above equations (I) and (II), N is a weighting factor. The weighting factor N is set at a value which is decided by experiment.

After the corrected x and y coordinates of the point B' are obtained, the corrected x and y coordinates are substituted for the variable sx and sy so that the point B' is set as a sampled point.

When a pen release event is detected at the point D, the touch panel controller 13 receives coordinates of the point D. In the touch panel controller 13, the coordinates of the point C are then corrected using the corrected coordinates x and y of the point B' and the coordinates X and Y of the point D in accordance the above equations (I) and (II). Due to this operation, the sampled point C is corrected so as to be changed to a point C'.

Coordinates of points detected by the touch panel 12 are corrected as described above, so that a line chaining the corrected points is closer, than a line chaining the points actually detected, to the movement locus which is actually drawn by the touch pen 31 on the touch panel 12.

Figure 5:
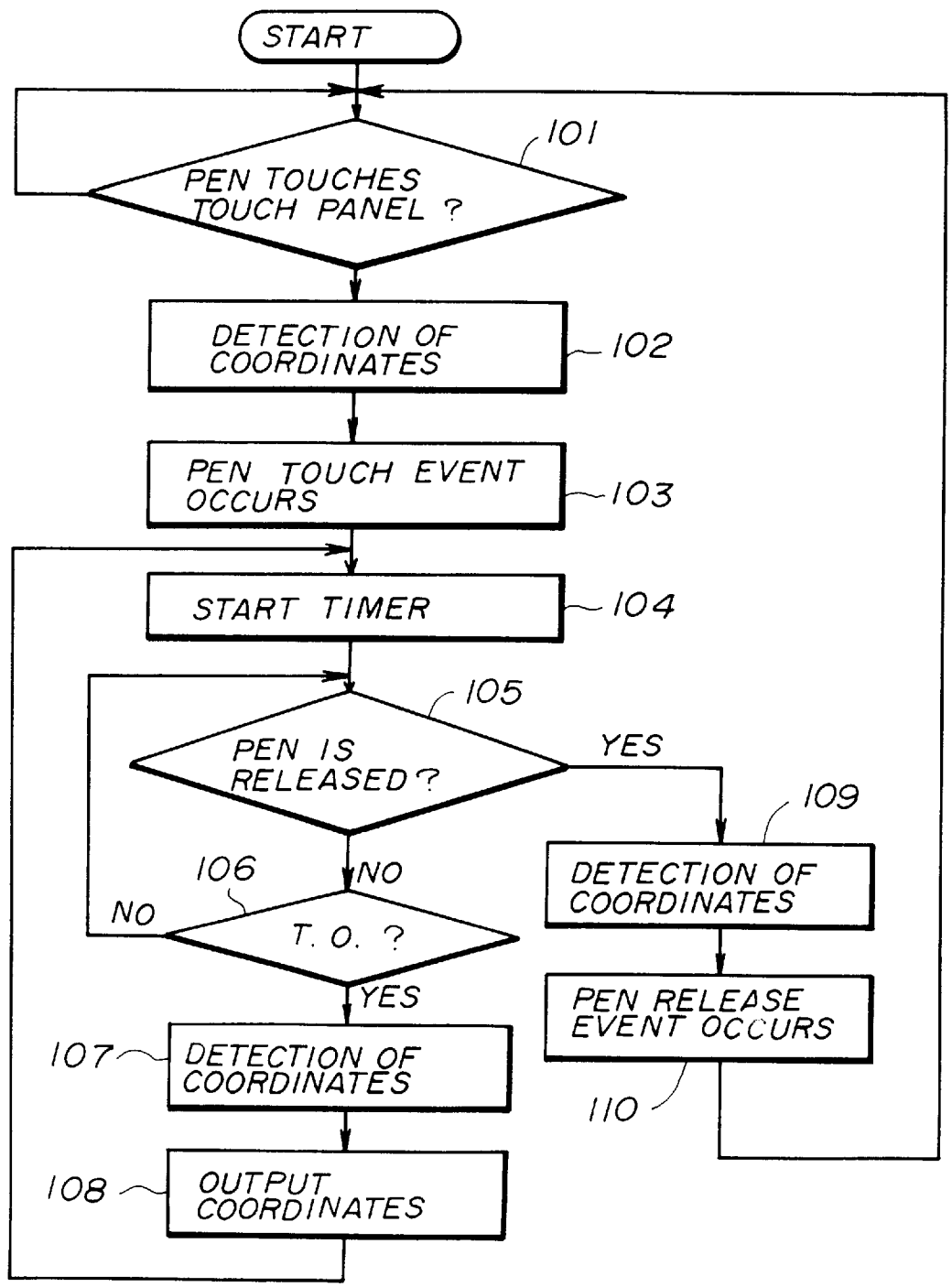
FIG. 5 is a flowchart illustrating a scanning process for input coordinates on a touch panel.

The touch panel 12 detects (samples) points on a movement locus of the touch pen 31 on the touch panel 12 in accordance with a procedure as shown in FIG. 5.

Referring to FIG. 5, a process for determining whether or not the touch pen 31 touches the touch panel 12 is repeated in step 101. When it is determined, in step 101, that the touch pen 31 touches the touch panel 12, X and Y coordinates of a point at which the touch pen 31 touches the touch panel 12 at this time are detected in step 102. After this, the touch panel 12 outputs a pen touch event in step 103. The pen touch event is supplied to the touch panel controller 13 along with the detected X and Y coordinates.

A timer for measuring a time corresponding to intervals at which coordinates of points should be sampled starts in step 104. After this, a process for determining, in step 105, whether or not the touch pen 31 is released from the touch panel 12 and a process for determining, in step 106, whether or not the timer times out (T.O.) are repeated. When it is determined, in step 106, that the timer times out, X and Y coordinates are detected in step 107 and the X and Y coordinates are output from the touch panel 12 in step 108. The X and Y coordinates are supplied, as coordinates of a sampled point, to the touch panel controller 13. After this, the process returns to step 104 to sample the next point.

When it is determined, in step 105, that the touch pen 31 is released from the touch panel 12, before the timer times out, X and Y coordinates of a point at which the touch pen 31 has been released from the touch panel 12 are detected in step 109 and the touch panel 12 outputs a pen release event in step 110. The pen release event is supplied to the touch panel controller 13 along with the X and Y coordinates. After this, the process returns to step 101.

The touch panel controller 13 corrects X and Y coordinates of sampled points supplied from the touch panel 12 in accordance with a procedure shown in FIG. 6.

Referring to FIG. 6, the touch panel controller 13 waits to receive one of a pen touch event, coordinates of a sampled point and a pen release event in steps 201, 202 and 203.

When the touch panel controller 13 receives a pen touch event along with X and Y coordinates, the X (ix) and Y (iy) coordinates are respectively substituted for the variables sx and sy in step 204.

When the X and Y coordinates of the sampled point are received, it is further determined, in step 205, whether or not the receiving of the X and Y coordinates is the first receiving after the pen touch event has occurred. If the receiving of the X and Y coordinates is the first receiving, the X (ix) and Y (iy) coordinates received in this case are respectively substituted for the variables wx and wy in step 206.

On the other hand, if it is determined, in step 205, that the receiving of the X and Y coordinates is not the first receiving, the X and Y coordinates are respectively substituted for the variables ix and iy. The X and Y coordinates for the variables wx and wy which represent a point (the focus point) sampled in the immediately previous sampling timing are corrected using the coordinates for the variables sx, sy, wx, wy and ix and iy in accordance with the equations (I) and (II) so that corrected coordinates x and y of the focus point are obtained, in step 207.

A line chaining a point represented by the corrected coordinates x and y and a point represented by the coordinates for variables sx and sy is then drawn in step 208.

After this, the corrected x and y coordinates are respectively substituted for the variables sx and sy and the coordinates of the variables ix and iy are respectively substituted for the variables wx and wy, in step 209. The process then returns to step 201 so that next cycle of the process starts. In the next cycle, the corrected x and y coordinates substituted for the variable sx and sy are used as coordinates of a point sampled before the focus point is sampled. In addition, the coordinates substituted for the variables wx and wy are used as coordinates of the focus point.

When the touch panel controller 13 detects the pen release event in step S203, the process proceeds to step S207. The above steps S207, 208 and 209 are carried out.

As has been described above, in the above embodiment, the coordinates of a sampled point are corrected using corrected coordinates of an immediately previous sampled point and coordinates of a next sampled point in accordance with the equations (I) and (II). Thus, an error between coordinates of a point at which the touch pen 31 actually touches the touch panel 12 and coordinates of a point represented by corrected coordinates is smaller than an error between the coordinates of the actually touched point and coordinates of a point detected by the touch panel 12. As a result, a line chaining sampled points represented by the corrected coordinates can be brought close to a locus on which the touch pen 31 actually moves on the touch panel 12.

The weight factor N in the above equations (I) and (II) may be equal to "1". In this case, the corrected coordinates are averages of coordinates of three points which are continuously arranged. In addition, the corrected coordinates of a focus point may be averages of coordinates of two points adjacent to the focus point.

In addition, the handwriting data-entry apparatus is applied to the teleconference terminal in the above embodiment. However, the handwriting data-entry apparatus may be applied to other devices, such as hand-held computers.

The present invention is not limited to the aforementioned embodiments, and variations and modifications may be made without departing from the scope of the claimed invention.

What is claimed is:

1. A handwriting data-entry apparatus comprising:

an input panel on which a line is drawn by a handwriting operation of a user;

sampling means or sampling points on the line drawn on said input panel at predetermined intervals and outputting coordinates of sampled points; and correcting means for correcting coordinates of at least one of the sampled points output by said sampling means based on a value obtained by averaging coordinates of points sampled before and after the at least one of the sampled points is sampled, and using the corrected coordinates of the at least one of the sampled points in correcting coordinates of at least one further of the sampled points.

2. The handwriting data-entry apparatus as claimed in claim 1, wherein said correcting means corrects the coordinates of the at least of the sampled points further using the coordinates of the at least one of the sampled points itself.

3. The handwriting data-entry apparatus as claimed in claim 1, wherein the coordinates used to correct the coordinates of the at least one of the sampled points includes coordinates of points sampled immediately before and after the coordinates of the at least one of sampled points are sampled.

4. The handwriting data-entry apparatus as claimed in claim 2, wherein said correcting means has calculating means for calculating averages of the coordinates of points sampled before and after the at least one of the sampled points is sampled and coordinates obtained by multiplying the coordinates of the at least one of the sampled points by weight factors, the averages being output as corrected coordinates of the at least one of the sampled points.

5. The handwriting data-entry apparatus as claimed in claim 1, wherein corrected coordinates previously obtained by said correcting means are used as coordinates of points sampled before the at least one of the sampled points is sampled.

6. A method for controlling a handwriting data-entry apparatus comprising an input panel on which a line is drawn by a handwriting operation of a user and sampling means for sampling points on the line drawn on said input panel at predetermined intervals and outputting coordinates of sampled points, said method comprising steps of:

(a) correcting coordinates of at least one of the sampled points output by said sampling means based on a value obtained by averaging coordinates of points sampled before and after the at least one of the sampled points is sampled;

(b) outputting corrected coordinates obtained by said step (a) as coordinates of a sampled point on the line drawn on said input panel; and (c) using the corrected coordinates of the at least one of the sampled points in correcting coordinates of at least one further of the sampled points.

7. The method as claimed in claim 6, wherein the coordinates of the at least one of the sampled points are corrected, in said step (a), further using the coordinates of the at least one of the sampled points itself.

8. The method as claimed in claim 6, wherein the coordinates used to correct the coordinates of the at least one of the sampled points includes coordinates of points sampled immediately before and after the coordinates of the at least one of the sampled points are sampled.

9. The method as claimed in claim 7, wherein said step (a) includes a step of calculating averages of the coordinates of the points sampled before and after the at least one of the sampled points is sampled and coordinates obtained by multiplying the coordinates of the at least one of the sampled points by weight factors, the averages being output as corrected coordinates of the sampled point in said step (b).

10. The method as claimed in claim 6, wherein corrected coordinates which have been previously obtained by said step (a) are used as coordinates of points sampled before the at least one of the sampled points is sampled.

* * * * *